(12) United States Patent
Yasuda et al.

(10) Patent No.: US 6,211,886 B1
(45) Date of Patent: Apr. 3, 2001

(54) GRAPHIC PREPARING DEVICE

(75) Inventors: Toshihiro Yasuda, Yamatokoriyama; Toshio Isoe, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/104,183

(22) Filed: Jun. 25, 1998

(30) Foreign Application Priority Data

Jul. 28, 1997 (JP) .................................................... 9-201185

(51) Int. Cl.[7] .................................................. G06T 11/80
(52) U.S. Cl. .............................................................. 345/435
(58) Field of Search ..................................... 345/434–439

(56) References Cited

U.S. PATENT DOCUMENTS

| | | | |
|---|---|---|---|
| 5,815,411 | * 9/1998 | Ellenby et al. | 364/559 |
| 5,831,664 | * 11/1998 | Wharton et al. | 348/13 |
| 5,864,632 | * 1/1999 | Ogawa et al. | 382/113 |
| 5,945,976 | * 8/1999 | Iwamura et al. | 345/139 |
| 5,956,737 | * 9/1999 | King et al. | 707/517 |

FOREIGN PATENT DOCUMENTS

08077242 * 3/1996 (JP) .................................. G06F/17/50

* cited by examiner

*Primary Examiner*—Matthew Luu
*Assistant Examiner*—G. F. Cunningham
(74) *Attorney, Agent, or Firm*—Nixon & Vanderhye P.C.

(57) ABSTRACT

In a graphic preparing device of the present invention, when a user wants to place an image of post office, which is not stored beforehand, on a road, the picture of the post office is taken by a CCD camera, and is displayed on an additional symbol display position of a symbol display section. When a confirmation key is pressed at a timing when a desirable symbol is displayed on a screen, the displayed image is stored as a symbol. Then, when inside of a frame of the additional symbol display position of the symbol display section is touched with an input pen, and is dragged to a predetermined position on the road, the image of post office as stored as a symbol is displayed on the road, and is stored as a symbol on a map. Namely, the symbol incorporated by the CCD camera is treated in the same way as a common symbol. Also, the frame of the symbol touched with the input pen is enhance-displayed.

18 Claims, 10 Drawing Sheets

GRAPHIC PREPARING DEVICE

FIELD OF THE INVENTION

The present invention relates to a graphic preparing device which carries out drawing and editing of graphics using a pointing device so as to prepare desired graphics, and particularly to a graphic preparing device which utilizes an image taken by a camera for graphic preparation.

BACKGROUND OF THE INVENTION

Conventionally, various graphic preparing devices for carrying out drawing and editing of graphics using a pointing device such as a mouse and an input pen have been proposed. For example, Japanese Unexamined Patent Publication No. 77242/1996 (Tokukaihei 8-77242) discloses a graphic preparing device in which, for example, a map is prepared with ease by selecting a map symbol displayed on a map chart display window, and by setting the map symbol in a region selected using a pointing device such as a mouse.

Also, in order to conveniently prepare leaflets, etc., a mouse pointer is moved onto one of the cells of a clip-art chart window, and the mouse pointer is moved while pressing down the mouse button, and the clip-art of the cell is directly moved and pasted to a working region.

However, in the conventional techniques such as above, graphics are prepared by simply using a map symbol or a clip-art which has already been stored beforehand, and types of graphics which can be prepared are limited. Namely, graphics can only be prepared in accordance with image information which has already been stored.

SUMMARY OF THE INVENTION

It is an object of the present invention to provide a graphic preparing device capable of preparing graphics in accordance with not only image information which has already been stored in the graphic preparing device but also image information which is not stored beforehand.

In order to achieve the above-mentioned object, a graphic preparing device in accordance with the present invention includes storing means for storing a plurality of first image information added to a prepared graphic, displaying means for displaying the plurality of first image information, and selecting-drawing means for selecting desired image information from the plurality of image information displayed by the displaying means so as to draw selected image information on a predetermined position on a display screen, the graphic preparing device further comprising image information incorporating means for incorporating image information into the graphic preparing device, the image information being different from the first image information stored in the storing means, wherein the displaying means deals with, when the image information is incorporated by the image information incorporating means, incorporated image information and the first image information stored in the storing means in the same manner.

With this arrangement, the plurality of first image information stored in the storing means are displayed on the displaying means, and desirable image information is selected by the selecting-drawing means, and the image information thus selected is drawn on a predetermined position, thus preparing a graphic such as a map.

The above arrangement further includes image information incorporating means for incorporating image information, different from the plurality of first image information, into the graphic preparing device, and incorporated image information and the plurality of first image information are displayed together on the displaying means so as to deal with the incorporated image information and the plurality of first image information in the same manner. Therefore, it is possible to select by the selecting-drawing means not only the plurality of first image information but also the incorporated image, thus allowing graphics to be prepared using these image information.

With this arrangement, even when desirable image information is not stored beforehand in the graphic preparing device, since it is possible to incorporate desirable image information into the graphic preparing device, graphics can also be prepared in accordance with image information which is not stored beforehand. As a result, it is possible to prepare various types of graphics.

For a fuller understanding of the nature and advantages of the invention, reference should be made to the ensuing detailed description taken in conjunction with the accompanying drawings.

DESCRIPTION OF THE EMBODIMENTS

[First Embodiment]

The following will describe one embodiment of the present invention referring to FIG. 1 through FIG. 5. Note that, the present invention is not limited to the following descriptions.

Figure 1:
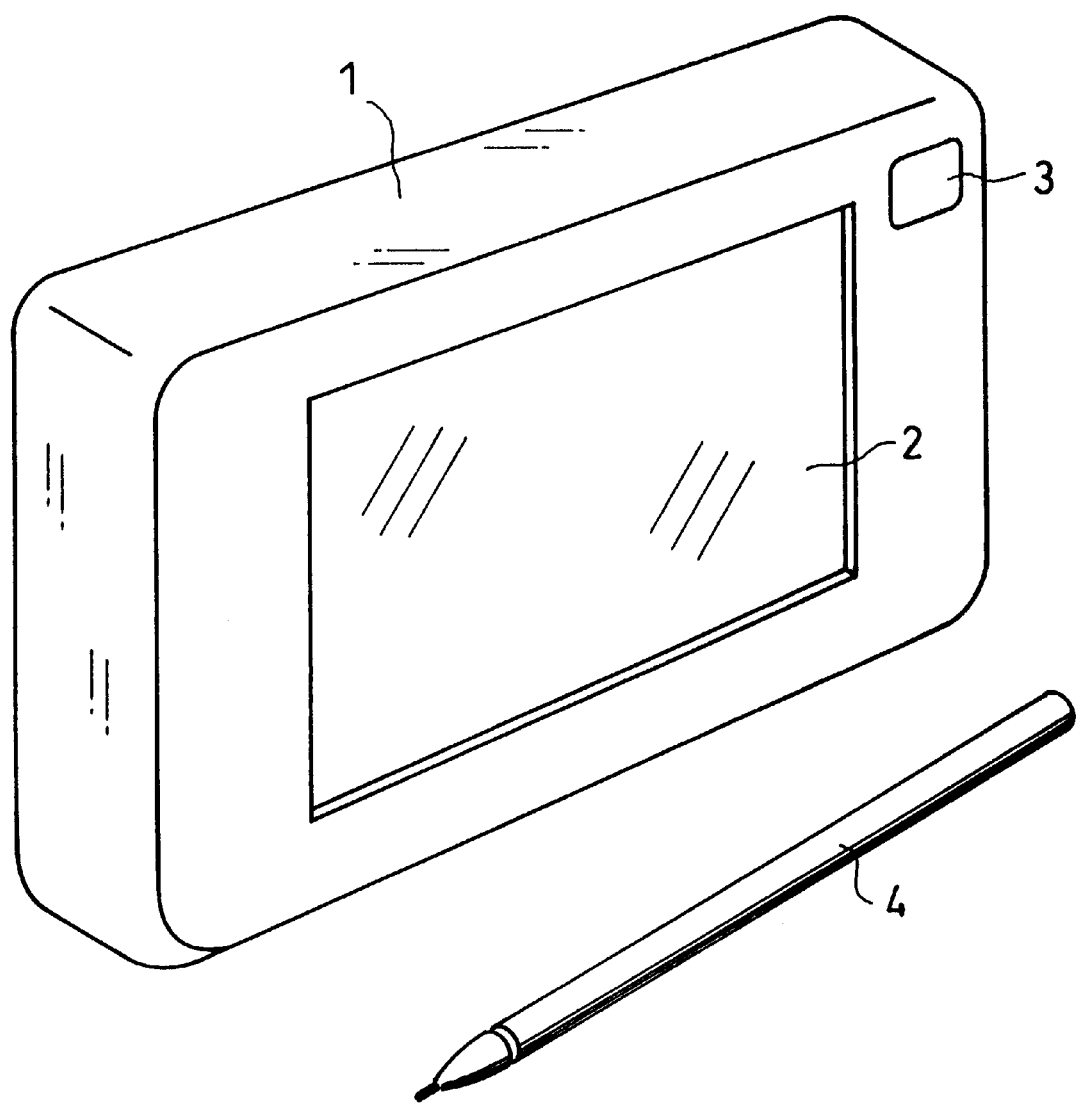
FIG. 1 is a perspective view of an outer view of a graphic preparing device in accordance with one embodiment of the present invention.
Figure 2:
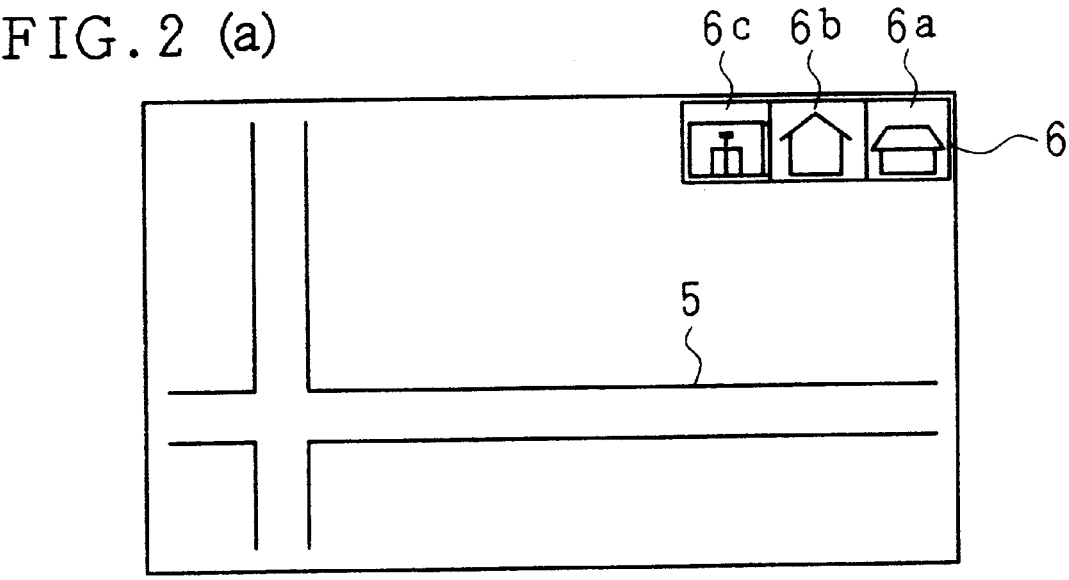
FIG. 2(*a*) and FIG. 2(*b*) are explanatory drawings respectively showing an example of a display screen of the graphic preparing device.
Figure 2:
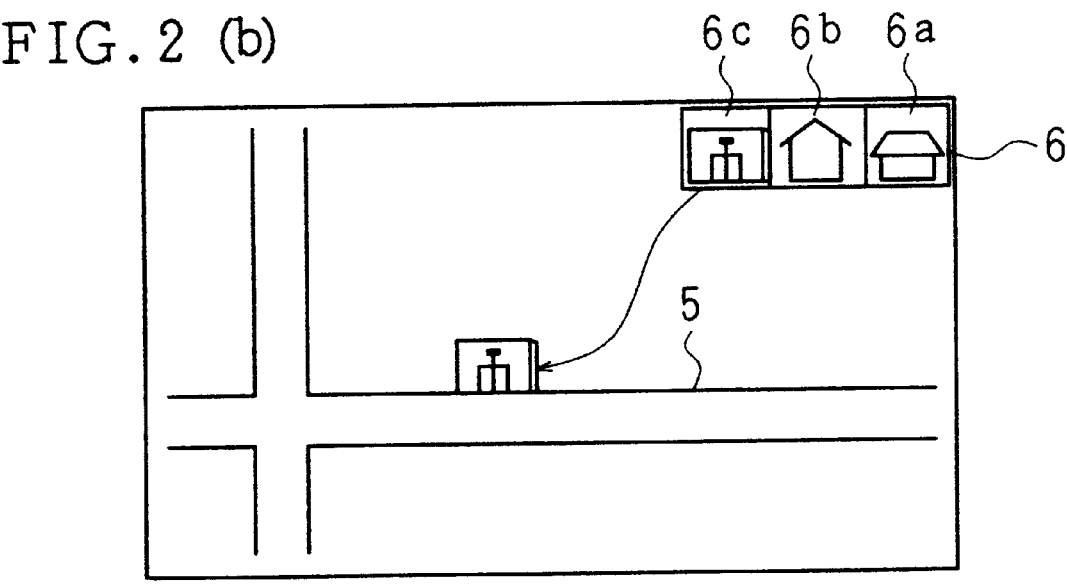

First, an outer view of a graphic preparing device in accordance with the present embodiment will be described. As shown in FIG. 1, the graphic preparing device is provided with a main cabinet section 1, an input-output section 2 (displaying means), a confirmation key 3 (confirming means), and an input pen 4 (selecting-drawing means).

The main cabinet section 1 includes a power switch and an input pen holder, etc. (not shown).

The input-output section 2 displays (a) an image taken by, for example, a CCD (Charge Coupled Device) camera 8

(image information incorporating means; see FIG. 3) and (b) data stored in the main cabinet section 1, and is composed of a thin LCD (Liquid Crystal Display) of matrix system capable of displaying characters and a transparent tablet with a size covering the LCD.

The transparent tablet has an arrangement wherein, for example, transparent electrodes are provided respectively on the inner surfaces of two transparent sheets, and small projectile spacers are printed in order to prevent the respective transparent electrodes of the sheets from contacting with each other under a normal condition. When the transparent tablet is pressed by a finger or the input pen 4 and the respective transparent electrodes of the sheets are brought into contact with each other, the position selected is detected by the transparent tablet.

Namely, the input-output section 2, in addition to displaying various data as mentioned above, receives various information as inputted by the input pen 4 or the finger.

Also, it is possible to distinguish the content of information displayed on the LCD, as selected by the user, by calculating the positional relationship between thereof and the displayed content displayed by the transparent tablet and the LCD.

Note that, the LCD may be provided on the back side with a backlight made from an EL panel, etc., as required.

The confirmation key 3 commands storing of, for example, a currently displayed image taken by the CCD camera 8. The input pen 4 specifies a position on the transparent tablet so as to specify, for example, (i) a position for displaying a taken image and (ii) enlargement-reduction and direction of the displayed image.

The following will describe an example of a display screen of the input-output section 2 referring to FIG. 2(a) and FIG. 2(b).

FIG. 2(a) illustrates a display screen of the input-output section 2, for example, when a road 5 is inputted in a map preparing mode for preparing a map. On a screen in the map preparing mode, as shown in FIG. 2(a), a symbol display section 6 is displayed on the upper right corner of the screen. The symbol display section 6 includes, for example, three display sections 6a, 6b, and 6c in this order from the right in a horizontal row.

Here, in the case where a symbol adding mode (described later) is not set, on the three display sections 6a, 6b, and 6c, symbols (first image information) stored beforehand in the graphic preparing device are displayed, respectively. Note that, the symbols are stored in a symbol storing area 13b or in a symbol information storing area 14b (both mentioned later). In the case where the symbol adding mode is set, the display section 6c on the left-most side becomes a display section for an additional symbol, and an image taken by the CCD camera 8 is displayed realtime on the display section 6c.

Thus, when the user wants to place an image of, for example, a post office, which is not stored in the image preparing device beforehand, on the road 5, first, the user sets the graphic preparing device to the symbol adding mode, and takes a picture of a post office by the CCD camera 8. This displays an image of the post office on the display section 6c of the symbol display section 6. When the confirmation key 3 is pressed at a timing when a desirable symbol is displayed on the screen, the displayed image (second image information) is stored as a symbol in the symbol information storing area 14b (see FIG. 3).

Then, when inside of the display section 6c of the symbol display section 6 is touched by the input pen 4, and is dragged to a predetermined position on the road 5, as shown in FIG. 2(b), an image of the post office stored as a symbol is displayed on the road 5, and the image is stored in the symbol information storing area 14b, and a graphic information storing area 14a (see FIG. 3) stores information as to which image stored in the symbol information storing area 14b was used. Also, the frame of the symbol touched by the input pen 4 is enhance-displayed.

In this manner, even when information necessary for preparing a map (graphic) is not stored beforehand in the graphic preparing device, by using the image taken by the CCD camera 8, it is possible to prepare a graphic in the same manner as a common symbol.

Figure 3:
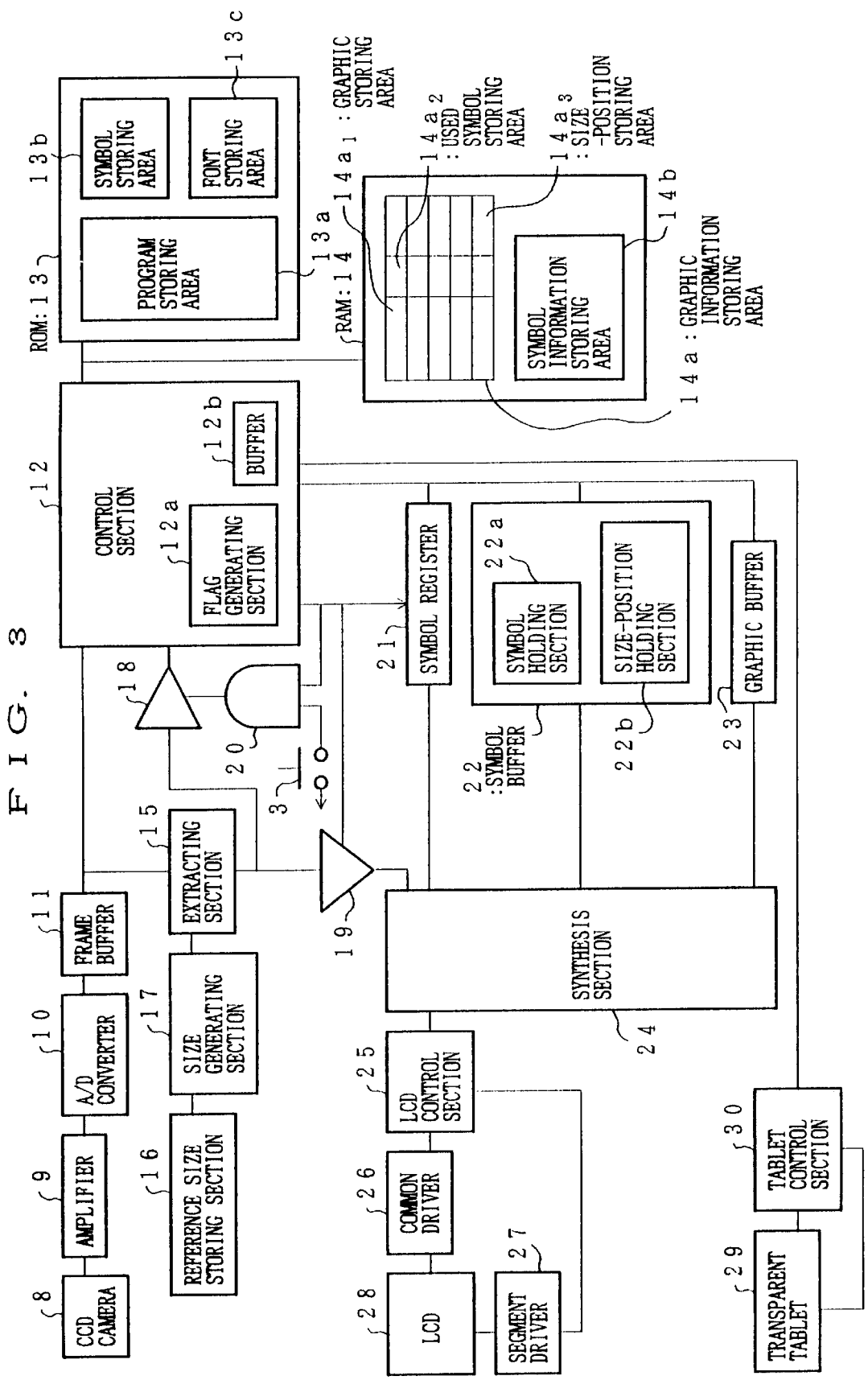
FIG. 3 is a block diagram showing a schematic structure of the graphic preparing device.

The following will describe an internal structure of the graphic preparing device. FIG. 3 is a block diagram showing a schematic structure of the graphic preparing device. An LCD 28 and a transparent tablet 29 have already described above. A common terminal of the LCD 28 is connected to a common driver 26, and a segment terminal of the LCD 28 is connected to a segment driver 27. The common driver 26 and the segment driver 27 respectively form a driving waveform with respect to the LCD 28 in accordance with the control of an LCD control section 25.

The transparent tablet 29 is connected to a tablet control section 30. The tablet control section 30 detects specified coordinates on the transparent tablet 29, and outputs the result of detection to a control section 12 after converting thereof to a digital signal.

The control section 12 controls the entire graphic preparing device, and carries out a control in accordance with a program stored in a program storing area 13a of a ROM 13.

The ROM 13, in addition to the program storing area 13a, includes the symbol storing area 13b and a font storing area 13c, etc. The symbol storing area 13b stores beforehand fixed symbols. The font storing area 13c stores a font such as characters to be displayed on the LCD 28.

A RAM 14 includes a graphic information storing area 14a (graphic information storing section) and the symbol information storing area 14b, etc. The graphic information storing area 14a stores graphic information such as a map prepared by the user. The symbol information storing area 14b stores as a symbol a new image as selected by the user. Namely, the ROM 13 and the RAM 14 constitute storing means.

The graphic information storing area 14a further includes (1) a graphic storing area $14a_1$ for storing graphics such as a road, (2) a used symbol storing area $14a_2$ for storing a symbol currently used in preparing a map, and (3) a size-position storing area $14a_3$ (size-position storing section) storing information of display coordinates and size, required for displaying of the symbol stored in the used symbol storing area $14a_2$ on a graphic.

A graphic such as a road stored in the graphic storing area $14a_1$ is sent to a graphic buffer 23 by the control section 12. The control section 12 calls the code of a symbol stored in the used symbol storing area $14a_2$, and then calls a symbol graphic corresponding to the code from the symbol storing area 13b of the ROM 13 or the symbol information storing area 14b of the RAM 14, and outputs the symbol graphic to a symbol holding section 22a provided in a symbol buffer 22. The control section 12 also outputs the content of the size-position storing area $14a_3$ to a size-position holding section 22b of the symbol buffer 22.

A synthesis section 24 (synthesizing means) synthesizes the symbol held in the symbol holding section 22a with the graphic in the graphic buffer 23 in a size and at a position stored in the sizeposition holding section 22b, and outputs the synthesized information. The information held in the graphic buffer 23 and the symbol buffer 22 are synthesized by the synthesis section 24 in this manner, and displayed on the LCD 28.

A symbol register 21 (holding means) holds three symbols to be displayed on the symbol display section 6 of FIG. 2(a). These symbols are selected out from the symbol storing area 13b of the ROM 13 and the symbol information storing area 14b of the RAM 14 by the control section 12. The synthesis section 24 synthesizes the symbols held by the symbol register 21 with the information of the graphic buffer 23 and the symbol buffer 22, and outputs the synthesized information. As a result, the three symbols are displayed on the display sections 6a, 6b, and 6c of the symbol display section 6, respectively.

When the user sets the symbol adding mode in this condition, a flag is set by a flag generating section 12a provided in the control section 12. As a result, the information held in the symbol register 21 are displayed on the symbol display section 6 by being shifted by one unit to the right. As a result, the display area (display area 6c) on the left-most side of the symbol display area 6 becomes vacant. The vacant display area is an area for displaying an image taken by the CCD camera 8, which should be newly stored.

The image as taken by the CCD camera 8 is outputted as an analog signal, amplified by an amplifier 9, and converted to a digital signal by an A/D converter 10. The digital signal converted by the A/D converter 10 is held by a frame buffer 11 having a capacity capable of storing an image of one screen.

A reference size storing section 16 stores, as a reference size, the size of one frame of the display sections of the symbol display section 6. A size generating section 17 (size generating means) generates a frame of a size in accordance with a value of the reference size. The information of the frame generated by the size generating section 17 is sent to an extracting section 15. The extracting section 15 (extracting means) extracts image information corresponding to the size of the generated frame from the frame buffer 11.

The image extracted by the extracting section 15 is outputted to a gate 18 and a gate 19. The gate 19 opens when a flag is set by the flag generating section 12a, and sends the image to the synthesis section 24. The image received by the synthesis section 24 via the gate 19 is synthesized at a position corresponding to the left end of the symbol register 21, and is displayed realtime on the display section 6c of the symbol display section 6 on the LCD 28.

When the user presses the confirmation key 3 at a timing when a screen desired to be incorporated as a symbol is displayed, the gate 18 is opened in response to a signal from an AND circuit 20. In response to this, the image which has been extracted by the extracting section 15 is sent to the control section 12 via the gate 18. Then, by the control section 12, the symbol information storing area 14b of the RAM 14 stores the image as a new symbol, and the symbol becomes available as a common symbol for future use. Note that, a buffer 12b provided in the control section 12 is a working buffer for use in moving the symbol.

Figure 4:
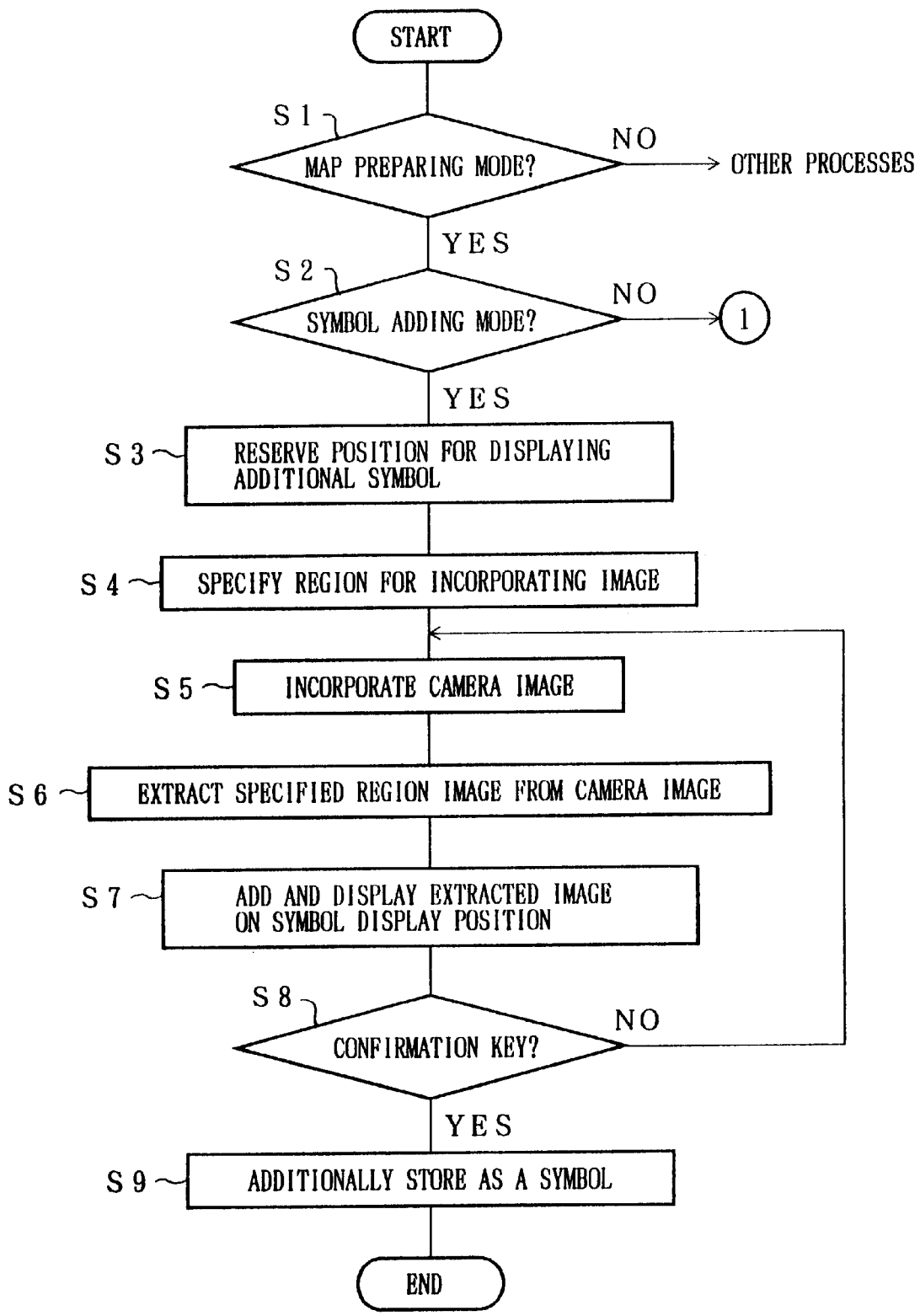
FIG. 4 is a flowchart showing a process in a symbol adding mode.

The following will explain an operation in the symbol adding mode referring to the flowchart of FIG. 4.

First, the control section 12 judges whether the map preparing mode is set (STEP 1; hereinafter STEP will be abbreviated to S). When it is judged in S1 that the map preparing mode is not set, other processes are carried out, and when it is judged in S1 that the map preparing mode is set, it is judged whether the symbol adding mode is set (S2). When it is judged in S2 that the symbol adding mode is not set, a normal process of using a pre-stored symbol is carried out. This process will be described later.

When it is judged in S2 that the symbol adding mode is set, a position for displaying an additional symbol is reserved in the symbol display section 6 (S3), and an image incorporating region is specified (S4). Then, an image taken by the CCD camera 8 is incorporated (S5), and an image in the specified region as specified in S4 is extracted from the image taken by the CCD camera 8 (S6).

Then, the extracted image is displayed on an additional symbol display position (S7), and it is judged whether the confirmation key 3 has been pressed (S8). When it is judged in S8 that the confirmation key 3 has not been pressed, the sequence returns to S5, and the process of S5 to S8 is repeated.

When it is judged in S8 that the confirmation key 3 has been pressed, the image when the confirmation key 3 was pressed is additionally stored as a symbol in the symbol information storing section 14b of the RAM 14 (S9), and the process of adding a symbol is finished.

Figure 5:
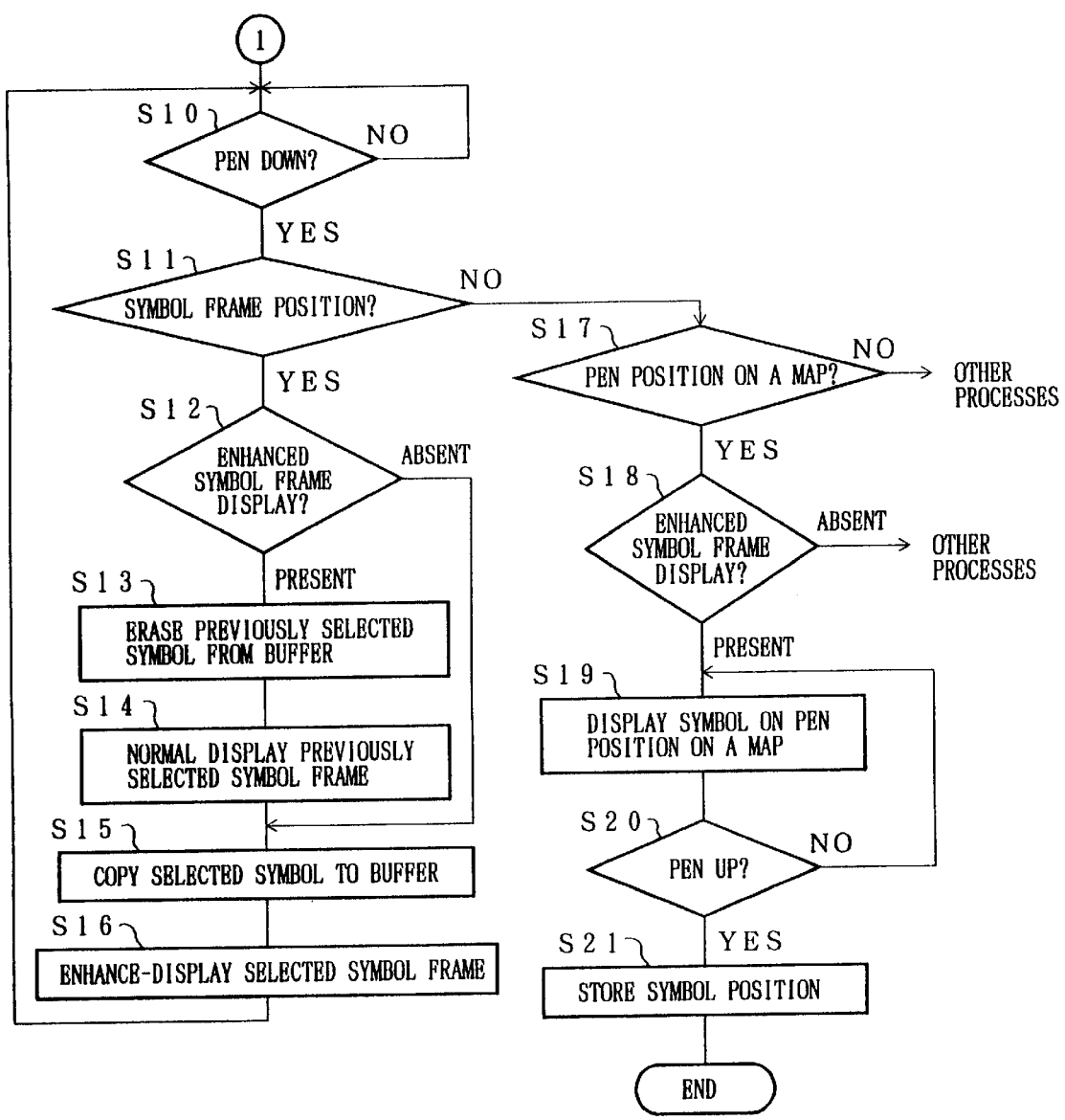
FIG. 5 is a flowchart showing a process using a stored symbol.

The following explains a process of using a pre-stored symbol (process when the symbol adding mode is not set in S2) referring to the flowchart of FIG. 5.

First, the input-output section 2 waits until the screen is touched with the input pen 4 by the user (S10). When the screen is touched with the input pen 4, it is judged whether the position touched with the input pen 4 is on the symbol display section 6 (S11).

When it is judged in S11 that the position touched with the input pen 4 is not on the symbol input section 6, the sequence goes to S17 (explained later). When it is judged in S11 that the position touched with the input pen 4 is on the symbol display section 6, it is judged whether any one of the frames of the display sections 6a through 6c of the symbol display section 6 is enhance-displayed (S12). When no symbol frame is enhance-displayed in S12, the sequence goes to S15 (explained later).

When any one of the symbol frame is enhance-displayed in S12, a previously selected symbol is erased from the buffer 12b of the control section 12 (S13). Then, the frame of the previously selected symbol is displayed normally (S14).

Thereafter, the symbol selected is copied to the buffer 12b of the control section 12 (S15), and the frame of the selected symbol is enhance-displayed (S16), and the sequence returns to S10.

Also, when it is judged in Sil that the position touched with the input pen 4 is not on the symbol display section 6, it is judged whether the position touched with the input pen 4 is on a map (S17). When it is judged in S17 that the position touched with the input pen 4 is not on the map, other processes are carried out, and when the position touched with the input pen 4 is on the map, it is judged whether there is a symbol frame which is enhance-displayed in the symbol display section 6 (S18).

When it is judged in S18 that there is no enhance-displayed symbol frame in the symbol display section 6, other processes are carried out, and when there is an enhance-displayed symbol frame, the symbol held by the buffer 12b of the control section 12 is displayed on a position on the map touched with the input pen 4 (S19).

Then, it is judged whether the input pen 4 has lost a contact with the input-output section 2 (S20). When the contact of the input pen 4 with the input-output section 2 is lost in S20, the current symbol is stored in the used symbol storing area $14a_2$, and the position is stored in the size-position storing area $14a_3$. (S21).

By the described processes, an image taken by the CCD camera 8 is displayed realtime on the symbol display section 6, and is used as a symbol.

[Second Embodiment]

The following will describe another embodiment of the present invention referring to FIG. 6 through FIG. 10. Note that, for convenience, members having the same functions as the members described in First Embodiment are given the same reference numerals and explanations thereof are omitted.

Figure 6:
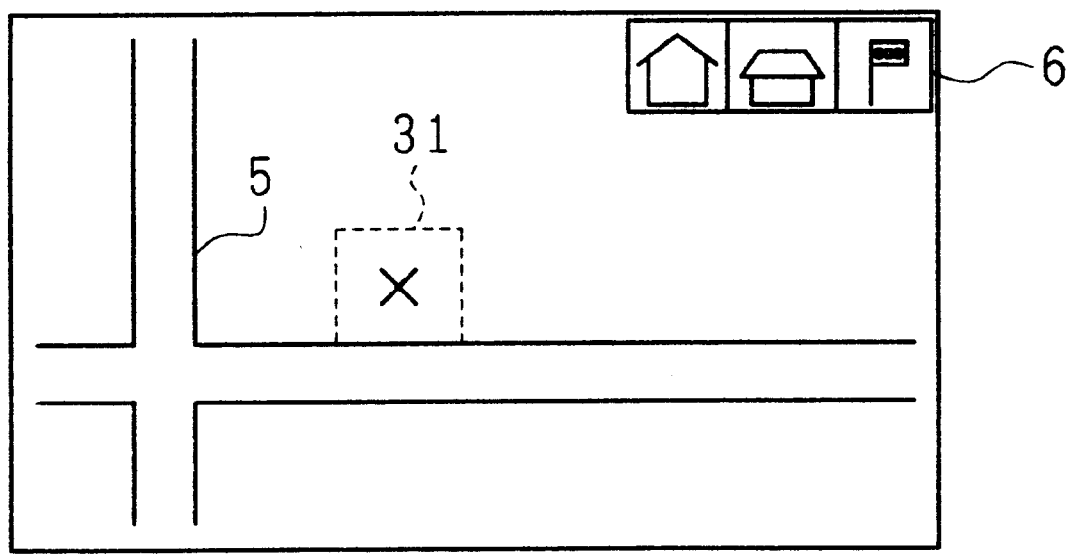
FIG. 6 is an explanatory drawing showing an example of a display screen of a graphic preparing device in accordance with another embodiment of the present invention.
Figure 7:
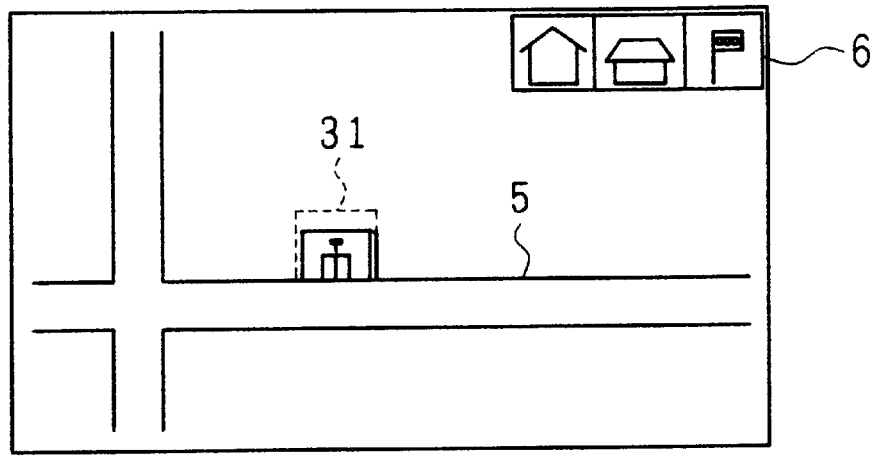
FIG. 7(*a*) through FIG. 7(*c*) are explanatory drawings respectively showing another example of a display screen of the graphic preparing device.
Figure 7:
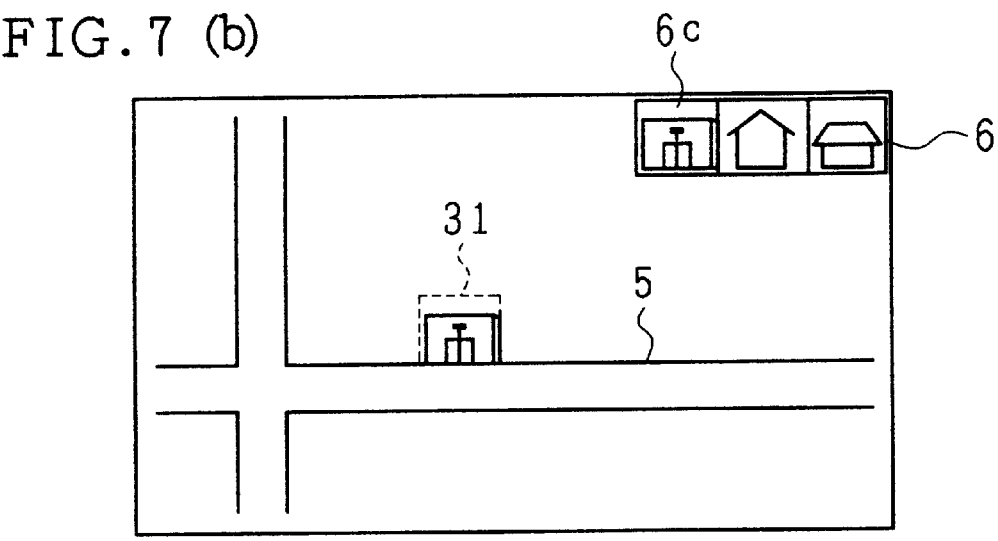
Figure 7:
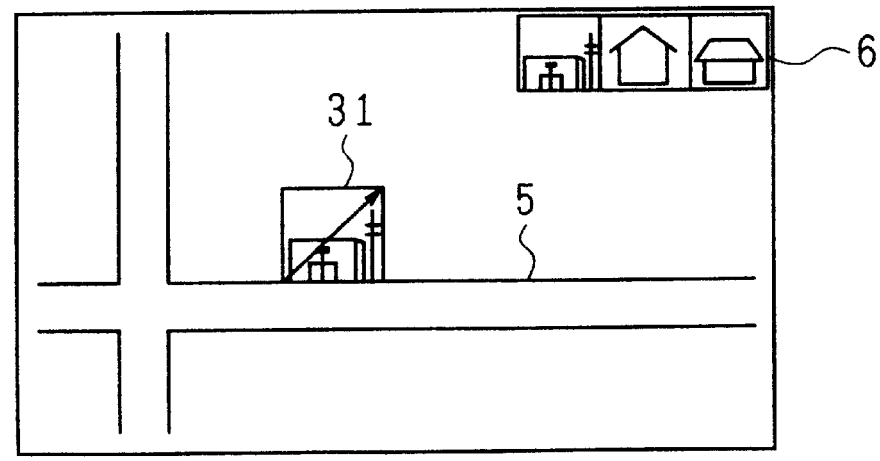
Figure 8:
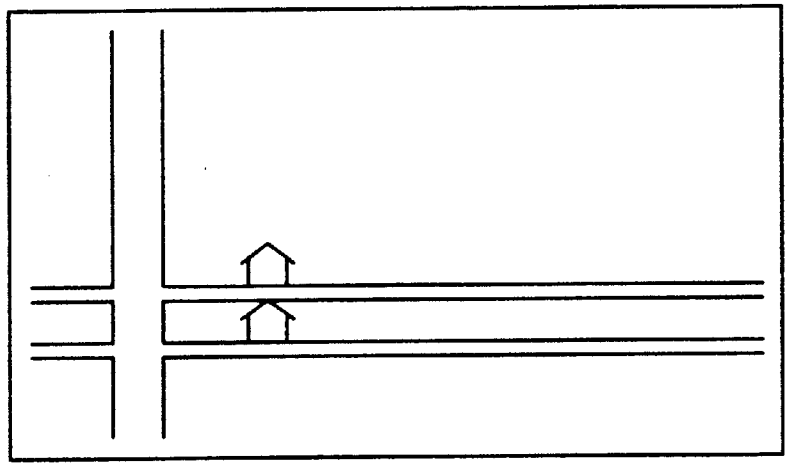
FIG. 8(*a*) through FIG. 8(*c*) are explanatory drawings respectively showing yet another example of a display screen of the graphic preparing device.
Figure 8:
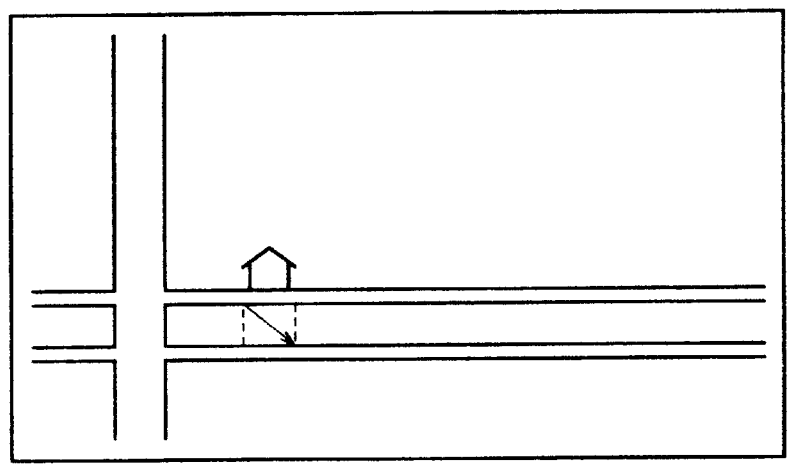
Figure 8:
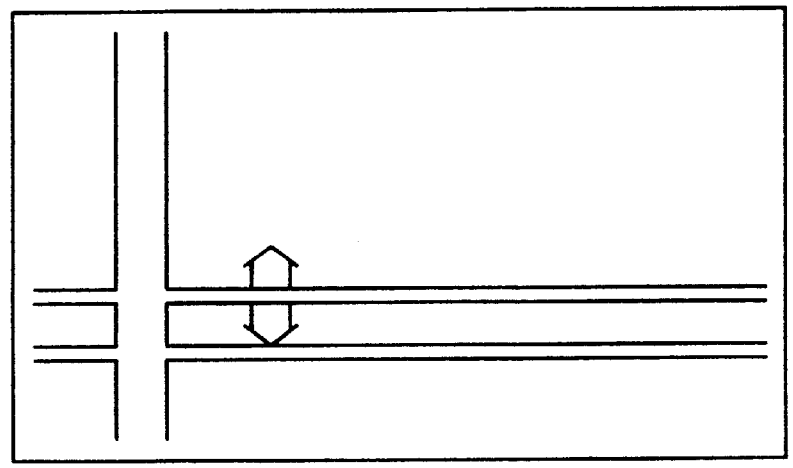

FIG. 6 shows a state in which a position for incorporating an image of a post office, which is not displayed on the symbol display section 6, is specified along a road 5 after creating the road 5. Here, a square frame 31 (specified region) is displayed, the center of the square frame being the position which has been specified by the input pen 4 (region specifying means), and the image is incorporated into this region.

FIG. 7(a) is a drawing of an image (post office), which has been incorporated by the CCD camera 8, displayed realtime in the frame 31. When the direction of the CCD camera 8 is changed, an image in accordance with this operation is displayed realtime in the frame 31. When the user presses the confirmation key 3 when an image which the user wants to incorporate into the frame 31 is displayed, the image is fixed on the screen, and the image incorporated is stored as a symbol. The image is then displayed on the display section 6c on the left-most side of the symbol display section 6 as a stock for future use (FIG. 7(b)).

In the example of FIG. 7(b), the fixed region is displayed in accordance with the position specified by the input pen 4; however, the region can be specified arbitrarily as shown in FIG. 7(c). This is carried out, for example, by specifying with the input pen 4 the both ends of the diagonal of a square (frame 32) constituting a region for incorporating the image. In this case, the region incorporating the image is enlarged, not the displayed image. Note that, the incorporating region may take the shape of a rectangle instead of a square. Also, as another way of specifying the region, icons indicating "large" and "small", etc., may be displayed, and an icon in accordance with the specifying region may be selected.

In the case where, as shown in FIG. 8(a), roads are in vicinities of each other with a building therebetween, as shown in FIG. 8(b), the region is specified from a point to be a base (ground). This allows the image to be displayed in accordance with the specified direction, and it is possible to recognize with ease the road grounding the building (FIG. 8(c)).

Figure 9:
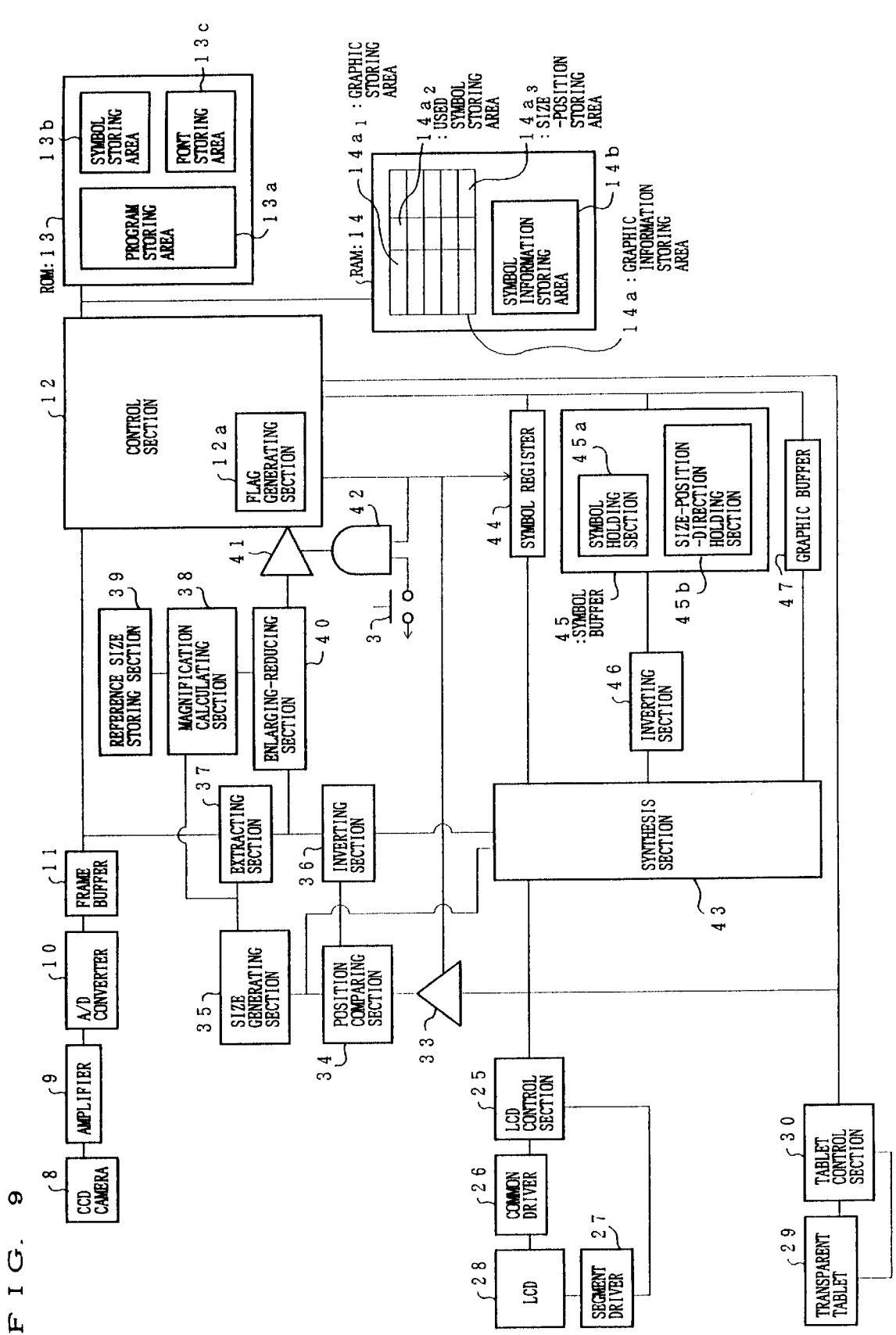
FIG. 9 is a block diagram showing a schematic structure of the graphic preparing device.

The following describes an internal structure of the graphic preparing device in accordance with the present embodiment referring to FIG. 9. Note that, in FIG. 9, since the functions of the following members are basically the same as the ones described in First Embodiment, the explanations of the following members are omitted: A CCD camera 8, an amplifier 9, an A/D converter 10, a frame buffer 11, a control section 12, a ROM 13, a RAM 14, an LCD 28, a common driver 26, a segment driver 27, an LCD control section 25, a transparent tablet 29, a tablet control section 30, a synthesis section 43, a graphic buffer 47, a symbol buffer 45, and an extracting section 37.

However, the present embodiment differs from First Embodiment in that in the RAM 14, the size-position storing area $14a_3$ of the graphic information storing area 14a additionally stores information of direction, and that in the symbol buffer 45, the size-position holding section 45b of the symbol buffer 45 additionally stores information of direction (in the present embodiment, the size-position storing area $14c_3$ is a size-position-direction storing area).

The following describes an operation of the graphic preparing device of the present embodiment.

The content of the graphic storing area $14a_1$ of the RAM 14 is sent to the graphic buffer 47, and the content of the used symbol storing area $14a_2$ and the content of the size-position storing area $14a_3$ are respectively sent to the symbol holding section 45a and the size-position holding section 45b. Here, in the case where direction information stored in the size-position holding section 45b is set, an inverting section 46 (first rotating means) rotates the symbol by a predetermined amount (for example 180° C.), and outputs the rotated symbol to the synthesis section 43.

A symbol register 44 corresponds to the symbol register 21 as described in FIG. 3 of First Embodiment; however, even when a flag is set by the flag generating section 12a, the image is not shifted.

The synthesis section 43 synthesizes (a) a symbol held by the symbol register 44, (b) the used symbol outputted from the inverting section 46, and (c) a graphic held in the graphic buffer 47, and outputs the synthesized symbol to the LCD 28 via the LCD control section 25. As a result, the graphics are displayed on the LCD 28.

Here, in response to setting of the symbol adding mode, a flag is set by the flag generating section 12a. This opens the gate 33, and the coordinates inputted from the transparent tablet 29 are sent to a position comparing section 34. The coordinates inputted here are the coordinates of the region for incorporating a symbol on the map of FIG. 7(c). The position comparing section 34 (position comparing means) judges the direction of the specified region from the specifying starting position and the specifying ending position of the region specification by the input pen 4, and when the direction is from the top to bottom, sends a signal to the inverting section 36.

A size generating section 35 generates a size-frame for the region specified by the transparent tablet 29, and outputs thereof to the extracting section 37 and a magnification calculating section 38. The extracting section 37 extracts from the frame buffer 11 the image in the size as obtained from the size generating circuit 35, and outputs the extracted image to the inverting section 36 and an enlarging-reducing section 40 (enlarging-reducing means).

An inverting section 36 (second rotating means), when a signal is received from the position comparing section 34, namely, when the region is specified from the top to bottom, rotates the image extracted by the extracting section 37 by a predetermined amount (for example 180° C.), and outputs the rotated image to the synthesis section 43.

Note that, in the inverting sections 36 and 46, although the image can be inverted to an mirror image, since it is possible that a notice board, etc., is included in an image depending on the use, in order to make the characters easy to read, the image is rotated, rather than inverted to an mirror image.

The synthesis section 43 synthesizes the image from the inverting section 36 and displays the image on a position of the specified region. When a desirable image for the user is displayed and the confirmation key 3 is pressed, a signal is sent to an AND circuit 42.

When the symbol adding mode is set, a HI signal is given to the other terminal of the AND circuit 42, and when a signal for opening the gate 41 is outputted from the AND circuit 42 in response to pressing of the confirmation key 3, an image which has been processed by the enlarging-reducing section 40 is outputted to the control section 12 via the gate 41.

The enlarging-reducing section 40 enlarges or reduces the image from the extracting section 37 to a specified size (size of one frame of symbol display section 6) in accordance with the magnification calculated by the magnification calculating section 38, and outputs the image to the gate 41. The magnification calculating section 38 calculates the enlargement rate of the size-frame generated by the size generating section 35 with respect to the reference size (size of one frame of symbol display section 6) stored in the reference size storing section 39.

The control section 12, upon receiving the image processed by the enlarging-reducing section 40, stores the image as a new symbol in the symbol information storing area 14b of the RAM 14, and stores the symbol in the left-most side of the symbol register 44. The size, position, and direction at the time when the confirmation is made and a sign for specifying the used symbol are stored in the size-position storing area $14a_3$ and the used symbol storing area $14a_2$, respectively. In accordance with this, the content of the symbol buffer 45 is updated.

Figure 10:
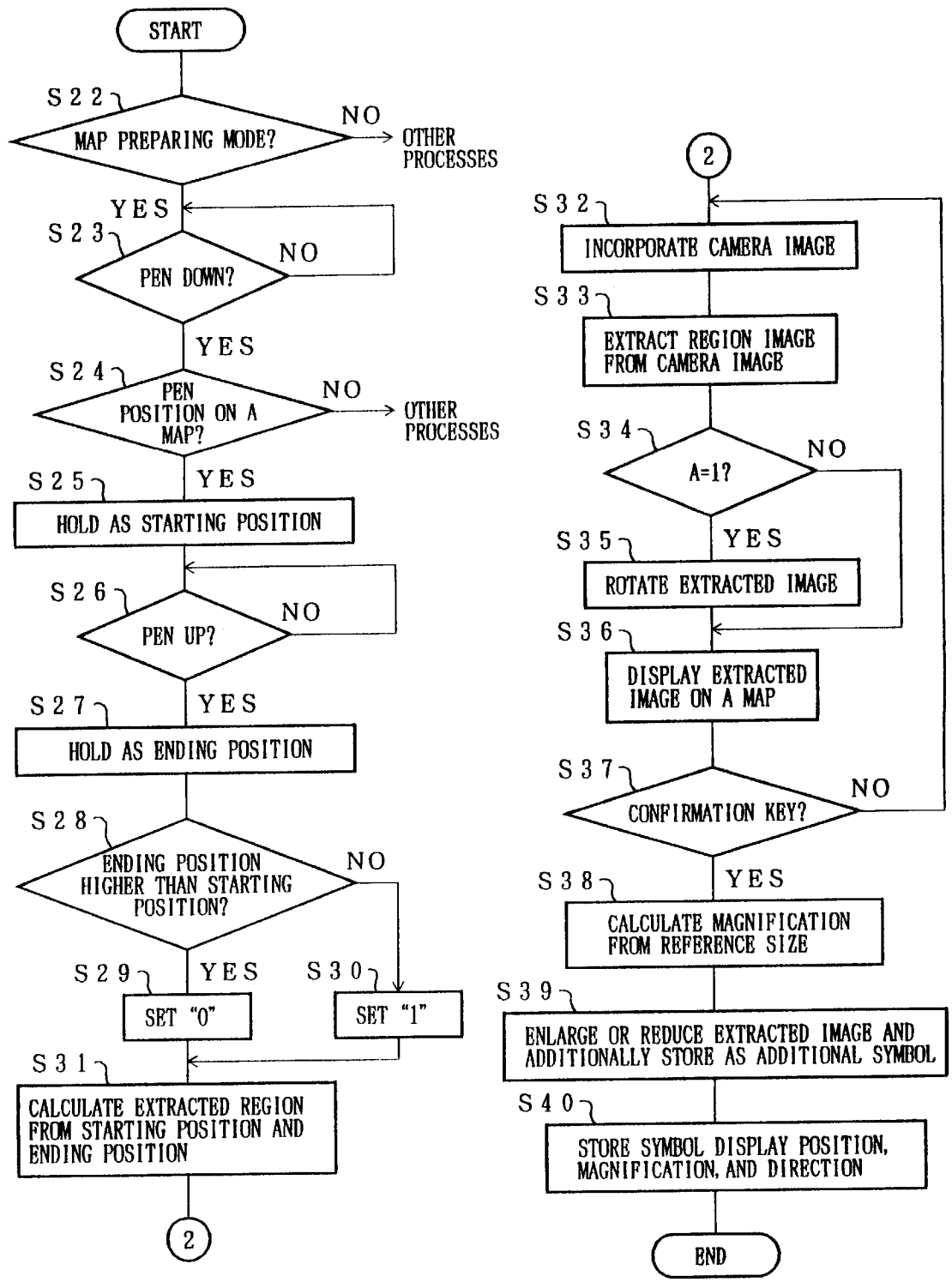
FIG. 10 is a flowchart showing a process in the symbol adding mode of the graphic preparing device.

The following will describe an operation in the symbol adding mode of the present embodiment referring to the flowchart of FIG. 10.

First, the control section 12 judges whether the map preparing mode is set (S22). When it is judged in S22 that the map preparing mode is not set, other processes are carried out, and when the map preparing mode is set, the input-output section 2 waits until touched by the input pen 4 (S23). When the input-output section 2 is touched with the input pen 4 in S23, it is judged whether the position touched with the input pen 4 is on the map of the input-output section 2 (S24).

When it is judged in S24 that the position touched with the input pen 4 is not on the map, other processes are carried out, and when the touched position is on the map, the position touched with the input pen 4 is held as a starting position in the position comparing section 34 (S25). Then, the input-output section 2 waits until the input pen 4 loses the contact (S26), and when the input pen 4 loses the contact with the input-output section 2, the position the input pen 4 lost the contact with the input-output section 2 is held as an ending position in the position comparing section 34 (S27).

Thereafter, it is judged whether the ending position held in S27 above the starting position held in S25 (S28). When it is judged in S28 that the ending position is above the starting position, "0" is set as information of direction in the size-position storing area $14a_3$ of the graphic information storing area 14a (S29). When it is judged in S28 that the ending position is not above the starting position, "1" is set as information of direction in the size-position storing area $14a_3$ of the graphic information storing area 14a (S30).

Then, an extraction region is calculated from the starting position and the ending position of the position comparing section 34 (S31). Then, an image taken by the CCD camera 8 is incorporated (S32), and an image in the region calculated in S31 is extracted from the camera image (S33).

Thereafter, it is judged whether "1" is set as information of "direction" in the size-position storing area $14a_3$ of the graphic information storing area 14a (S34). When it is judged in S34 that "1" is not set as information of "direction" in the size-position storing area $14a_3$, the sequence goes to S36, when it is judged in S34 that "1" is set as information of "direction" in the size-position storing area $14a_3$, the extracted image is rotated (S35), and the rotated extracted image is displayed on the map of the input-output section 2 (S36).

Then, it is judged whether the confirmation key 3 has been pressed (S37). When the confirmation key 3 is not pressed in S37, the sequence returns to S32, and the process of S32 to S37 is repeated.

When the confirmation key 3 is pressed in S37, the content of the reference size storing section 39 and the extraction region calculated in S31 are compared so as to calculate magnification (S38). Then, the extracted image is enlarged or reduced in accordance with the magnification calculated in S38, and is additionally stored as an additional symbol in the symbol information storing area 14b of the RAM 14 (S39). Thereafter, the display position, magnification, and direction of the symbol are stored in the size-position storing area $14b_3$(S40).

In this manner, in the present embodiment, it is also possible to prepare a graphic by displaying realtime the image taken by the CCD camera 8 on the display screen. Also, the image can be additionally stored as a symbol, allowing the symbol to be used in the future use. Further, it is possible to change the size of the region for incorporating the image to an arbitrary size, and display direction of a graphic can be determined in accordance with the moving direction of the input pen 4 when the region is specified.

As described, the graphic preparing device in accordance with the present invention having a storing means for storing a plural types of image information required for preparing graphics, chart displaying means for chart-displaying a predetermined number of image information stored in the storing means, selecting means for selecting desired image information from the image information chart-displayed by the chart displaying means, and drawing means for drawing the image information selected by the selecting means on a specified position on a display screen, is characterized by including image inputting means composed of a camera, displaying means for displaying realtime image information inputted from the image inputting means on a corner of the chart displaying means, and additional storing means for additionally storing the image information in the storing means in response to confirmation of the image information displayed on the displaying means.

With this arrangement, it is possible to prepare with ease various graphics using not only pre-stored image information but also image information taken by a camera.

Also, the graphic preparing device in accordance with the present invention having a storing means for storing a plurality of image information required for preparing graphics, chart displaying means for chart-displaying a predetermined number of image information stored in the storing means, selecting means for selecting desired image information from the image information chart-displayed by the chart displaying means, and drawing means for drawing the image information selected by the selecting means on a specified position on a display screen, is characterized by including image inputting means composed of a camera, specifying means for specifying an input region on the display screen, displaying means for displaying realtime image information inputted from the image inputting means on the input region specified by the specifying means, drawing means for drawing the image information in the input region in response to confirmation of the image information displayed by the displaying means, and additional storing means for additionally storing the image information in the storing means in response to confirmation of the image information displayed on the displaying means.

With this arrangement, it is possible to prepare with ease various graphics using not only pre-stored image information but also image information taken by a camera. Additionally, it is also possible to use the added image information in the following graphic preparation.

Further, the graphic preparing device in accordance with the present invention is characterized in that the additional storing means additionally stores the image information by enlarging or reducing thereof.

With this arrangement, it is possible to prepare graphic with a high degree of freedom.

Further, the graphic preparing device in accordance with the present invention is characterized in that the displaying means detects the specified direction of the input region specified by the specifying means so as to display, in accordance with the result of detection, the image information in a rotated manner.

With this arrangement, it is possible to prepare accurate and easy-to-understand graphics.

Note that, in the present invention, as means for incorporating image information which is not stored beforehand in the graphic preparing device, the CCD camera 8 is adopted. However, the same effect as in the present invention can be obtained by adopting, for example, a personal computer, digital scanner, and digital camera, etc.

Also, in the present invention, in order to position predetermined image information on the upper side or the lower side of the road 5 created horizontally on the display screen, the image information is rotated 180° by the inverting sections 36 and 46 as required. However, when the road 5 is created, for example, vertically on the display screen, and when positioning predetermined image information on the right side or the left side of the road 5, the inverting sections 36 and 46 rotate the image information by 90° or 270°.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A graphic preparing device comprising:
   storing means for storing a plurality of first images added to a prepared graphic;
   displaying means for displaying the plurality of first images; and
   selecting-drawing means for selecting a desired image from the plurality of images displayed by said displaying means so as to draw the selected image at a predetermined position on the prepared graphic,
   said graphic preparing device further comprising image incorporating means for incorporating images into said graphic preparing device, the images being different from the first images stored in said storing means,
   wherein said displaying means displays, when the images are incorporated by said image incorporating means, the incorporated images together with the first images stored in said storing means,
   wherein said displaying means displays the incorporated images in real time,
   said graphic preparing device further comprising confirming means for extracting from the incorporated images a momentary image suitable for adding to the prepared graphic so as to confirm the extracted image as a second image, and
   said displaying means displays the second image after confirmation of the second image is made by said confirming means.

2. The graphic preparing device as set forth in claim 1, wherein said image information incorporating means is a camera.

3. The graphic preparing device as set forth in claim 1, wherein the second image confirmed by said confirming means is additionally stored in said storing means as one of the plurality of first images.

4. The graphic preparing device as set forth in claim 1, wherein said storing means includes a graphic storing section for storing a plurality of graphics,
   said graphic preparing device further comprising synthesizing means for (a) synthesizing, when the plurality of first images are selected by said selecting-drawing means, the plurality of first images and the plurality of graphics, and (b) synthesizing, when the second image is selected, the second image and the plurality of graphics, so as to display respective results of synthesis on said displaying means.

5. The graphic preparing device as set forth in claim 4, wherein said storing means further includes a size-position storing section for storing information of (a) a size of the plurality of first images and (b) a synthesis position of the plurality of first images and the plurality of graphics, and
   said synthesizing means synthesizes, when the plurality of first images are selected by said selecting-drawing means, the plurality of first images and the plurality of graphics in accordance with the information stored in said size-position storing section.

6. The graphic preparing device as set forth in claim 5, further comprising:
   size generating means for generating a frame with a size in accordance with a display frame of the second image; and
   extracting means for extracting the second image in accordance with the size of the frame generated by said size generating means,
   wherein said synthesizing means synthesizes, when the second image is selected by said selecting-drawing means, the second image extracted by said extracting means and the plurality of graphics stored in said graphic storing section.

7. The graphic preparing means as set forth in claim 4, further comprising:
   holding means for holding a predetermined number of the plurality of first images stored in said storing means,
   wherein said holding means reduces by one a number of the plurality of first images held when the second image is selected by said selecting-drawing means, and
   said synthesizing means displays the remaining plurality of first images held by said holding means, together with the second image selected, on said displaying means.

8. The graphic preparing device as set forth in claim 1, further comprising:
   region specifying means for specifying a region in which an image should be drawn,
   wherein said displaying means displays, when an image is incorporated by said image incorporating means, the incorporated image on the specified region.

9. The graphic preparing device as set forth in claim 8, wherein a size of the specified region is variable.

10. The graphic preparing device as set forth in claim 8, wherein said storing means additionally stores the second image confirmed by said confirming means.

11. The graphic preparing device as set forth in claim 10, further comprising:

enlarging-reducing means for enlarging or reducing the second image, wherein said storing means additionally stores the second image enlarged or reduced by said enlarging-reducing means.

12. The graphic preparing device as set forth in claim 8, wherein said storing means includes a graphic storing means for storing a plurality of graphics, said graphic preparing device further comprising synthesizing means for (a) positioning, when the plurality of first images are selected by said selecting-drawing means, the plurality of first images on the specified region so as to synthesize thereof with the plurality of graphics, and (b) positioning, when the second image is selected, the second image on the specified region so as to synthesize thereof with the plurality of graphics, so as to display respective results of synthesis on said displaying means.

13. The graphic processing device as set forth in claim 12, wherein said storing means further includes a size-position-direction storing means for storing information of (a) a size of the plurality of first images, (b) a synthesis position of the plurality of first images and the plurality of graphic, and (c) a drawing direction of the plurality of first images, and said synthesizing means synthesizes, when the plurality of first images are selected by said selecting-drawing means, the plurality of first images and the plurality of graphics in accordance with the information stored in the size-position-direction storing means.

14. The graphic preparing means as set forth in claim 13, further comprising first rotating means for rotating the plurality of first images by a predetermined amount, wherein said first rotating means rotates, when information of direction is stored in the size-position-direction storing means, the plurality of first images by a predetermined amount, and said synthesizing means synthesizes the plurality of first images rotated and the plurality of graphics.

15. The graphic preparing device as set forth in claim 12, further comprising:

position comparing means for comparing a region specifying starting position and a region specifying ending position when a region is specified by said region specifying means; and second rotating means for rotating the second image by a predetermined amount so as to output thereof to said synthesizing means in accordance with a result of comparison between the region specifying starting position and the region specifying ending position by said position comparing means.

16. The graphic preparing device as set forth in claim 15, wherein said second rotating means outputs, when the region specifying starting position is above the region specifying ending position on a display screen, selected predetermined images by rotating thereof 18°.

17. The graphic preparing device as set forth in claim 2, wherein said camera is a CCD camera.

18. The graphic preparing device as set forth in claim 1, wherein the prepared graphic is a map.

* * * * *